Figure 9:
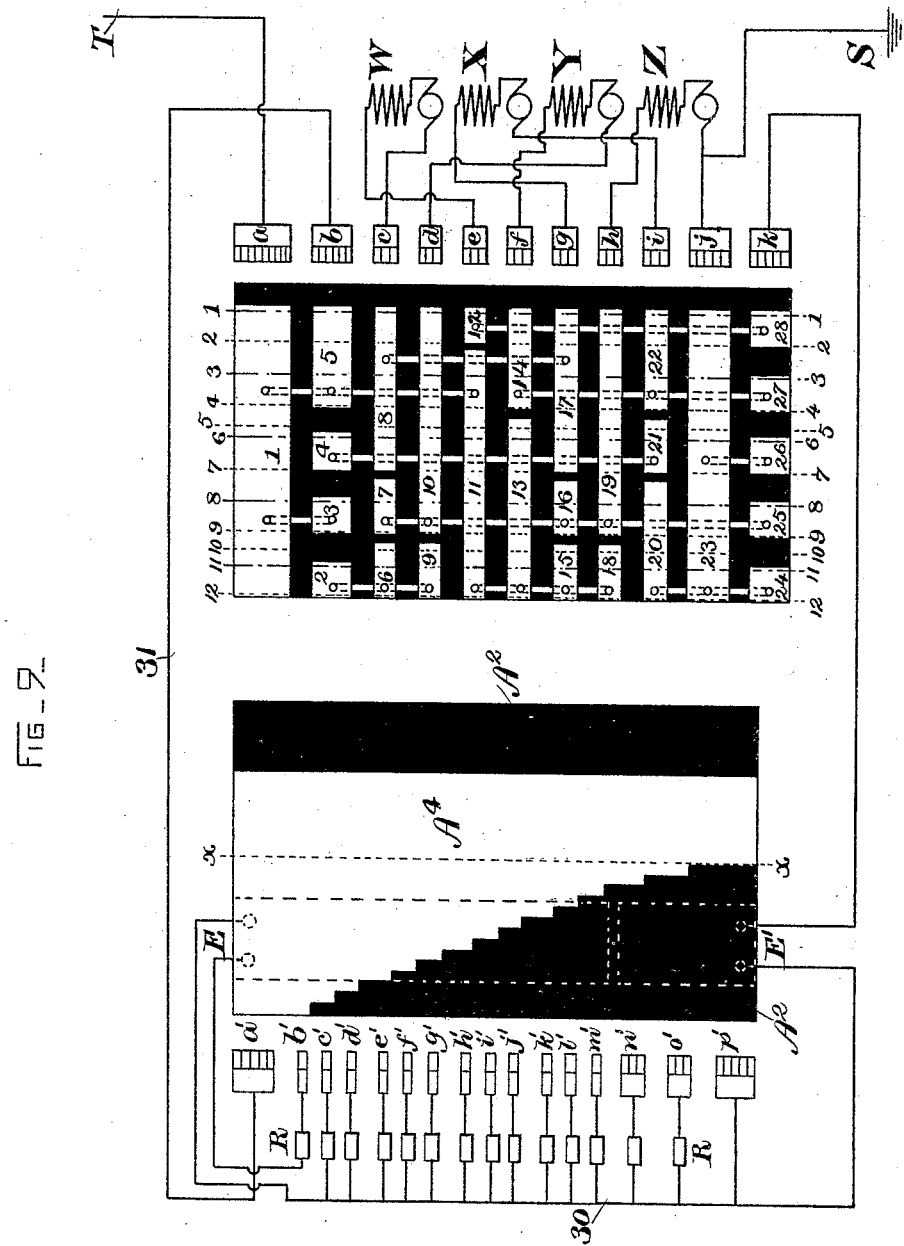

(No Model.) 4 Sheets—Sheet 1.
W. H. KNIGHT & J. W. DARLEY, Jr.
CONTROLLER FOR DYNAMO ELECTRIC MACHINES.
No. 554,276. Patented Feb. 11, 1896.
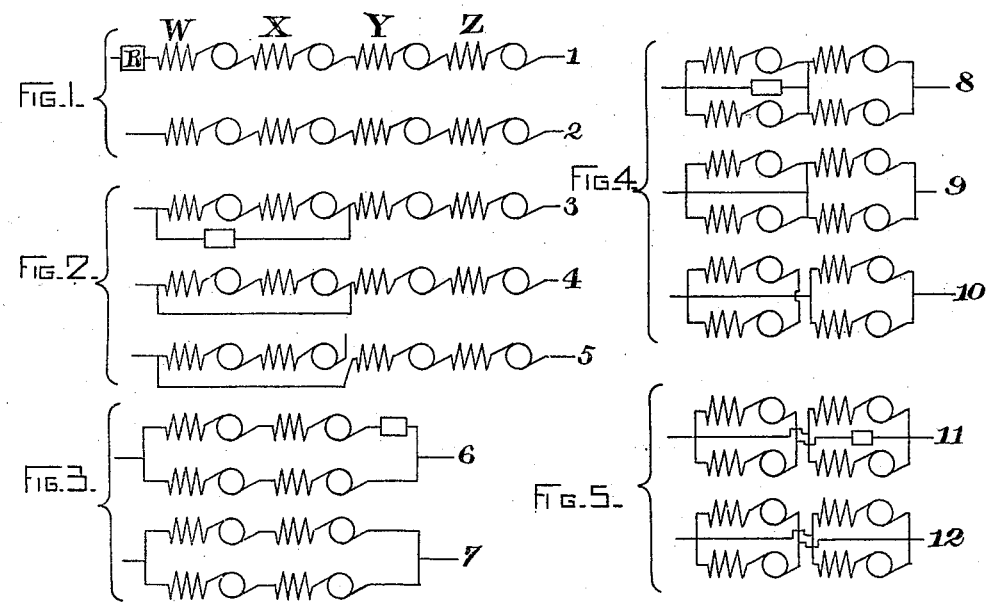
WITNESSES
Alec F. Macdonald
A. C. Orne
INVENTORS
Walter H. Knight
John W. Darley Jr.
by Bentley & Blodgett
Attys (No Model.) 4 Sheets—Sheet 2.
W. H. KNIGHT & J. W. DARLEY, Jr.
CONTROLLER FOR DYNAMO ELECTRIC MACHINES.
No. 554,276. Patented Feb. 11, 1896.
FIG_6_
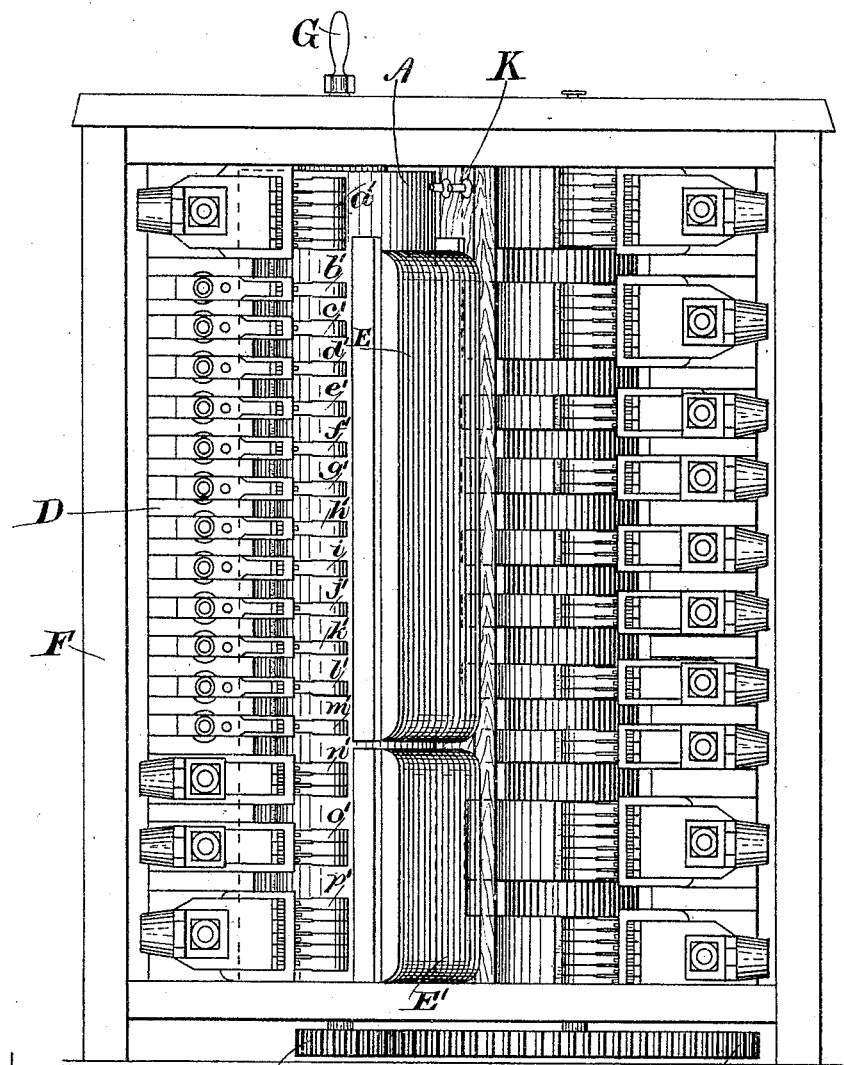

(No Model.) 4 Sheets—Sheet 3.
W. H. KNIGHT & J. W. DARLEY, Jr.
CONTROLLER FOR DYNAMO ELECTRIC MACHINES.
No. 554,276. Patented Feb. 11, 1896.
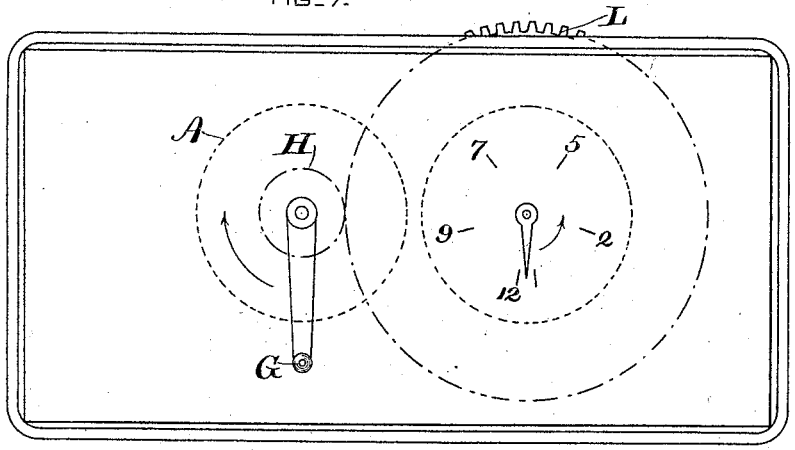
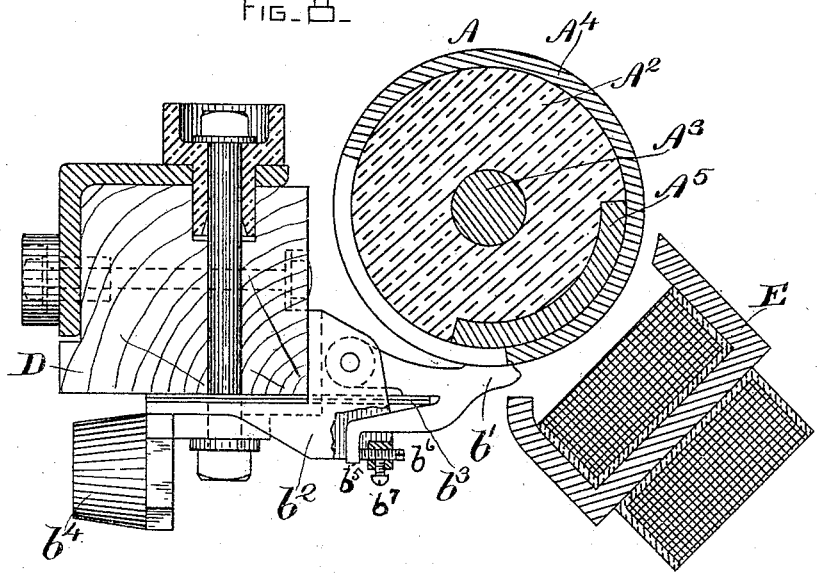
WITNESSES
Alec F. Macdonald.
W. H. Bentley.
INVENTORS.
Walter H. Knight
John W. Darley Jr
by Bentley Blodgett
Attys (No Model.) 4 Sheets—Sheet 4.

W. H. KNIGHT & J. W. DARLEY, Jr.
CONTROLLER FOR DYNAMO ELECTRIC MACHINES.

No. 554,276. Patented Feb. 11, 1896.

WITNESSES
Alec F Macdonald.
A C Hall

INVENTORS
Walter H. Knight
John W. Darley Jr.
by Bentley & Blodgett
Attys

UNITED STATES PATENT OFFICE.

WALTER H. KNIGHT, OF LYNN, MASSACHUSETTS, AND JOHN W. DARLEY, JR., OF BALTIMORE, MARYLAND.

CONTROLLER FOR DYNAMO-ELECTRIC MACHINES.

SPECIFICATION forming part of Letters Patent No. 554,276, dated February 11, 1896.

Application filed May 6, 1893. Serial No. 473,326. (No model.)

*To all whom it may concern:*

Be it known that we, WALTER H. KNIGHT, residing at Lynn, county of Essex, State of Massachusetts, and JOHN W. DARLEY, Jr., residing at Baltimore, State of Maryland, citizens of the United States, have invented certain new and useful Improvements in Controllers for Dynamo-Electric Machines, of which the following is a specification.

Our invention consists in general in a device for changing two or more dynamo-electric machines, especially motors, from series to parallel connections; and in our invention we provide a resistance which is included in the circuit during the time that the successive changes in the motor connections are being made. The purpose of this arrangement is to permit of the changes being made without any sudden and dangerous rush of current, so that the gradations in speed of the machines acting together are made without injury to the machines themselves and without discomfort to passengers by reason of unexpected shocks when motors of this kind are used in connection with electric-railway apparatus.

It is also to be noted that our invention is especially applicable to cases where a number of large motors are used, as in a locomotive, and that the special arrangement we have designed permits of the same resistance being used at each period of change in the motor connections, obviating thereby the use of a large number of separate resistances.

Referring to the accompanying drawings, Figures 1, 2, 3, 4, and 5 illustrate diagrammatically the manner in which four motors are successively connected in order to pass from the series to parallel connections. Fig. 6 is a side elevation of our controller with the side of the inclosing box removed. Fig. 7 is a plan thereof. Fig. 8 is a sectional detail showing the resistance-cylinder with the contact-pieces resting thereon and the blow-out magnet adjacent thereto, and Fig. 9 is a development of the switch-cylinder and rheostat contacts.

Our controller consists principally of two cylinders, one of which, called herein the "switch-cylinder," has a series of contact-pieces thereon against which bear brushes connected to the motor-terminals, so that by the rotation of the cylinder various connections between the motors are established, while the other or rheostat cylinder is provided with a single contact-plate adapted to connect with a series of rheostat-terminals, so as to bring more or less of the rheostat into circuit.

The two cylinders just mentioned are geared so as to rotate together, but at different rates of speed, the rheostat-cylinder making five revolutions while the switch-cylinder is making but one. By this arrangement (as there are in the case we have chosen for illustration five distinct arrangements of motors corresponding to five gradations in speed) the resistances controlled by the rheostat-cylinder will be brought into and out of circuit five times in succession while the switch-cylinder is rotating once, to establish in succession the various groupings of the motors. The rheostat-cylinder is so adjusted relatively to the switch-cylinder that the greatest resistance is inserted in the circuit and then gradually reduced during the period that the switch-cylinder is making a change from one motor grouping to another. After this change has been effected there is a short movement of both cylinders during which no change is effected in the motor connections and no resistance remains in the circuit. These five points corresponding to the said short spaces of movement are the five running positions—that is, when the controller has both of its cylinders stopped at this point the motors will operate without any resistance in circuit and give a definite rate of speed for as long a time as may be desirable.

Referring now to the drawings, we will first describe the rheostat-cylinder.

Referring to Figs. 7 and 8, it will be seen that the cylinder A is mounted on a central shaft $A^3$ and is principally composed of non-conducting material $A^2$ having upon its outside a stepped contact-plate $A^4$ of the shape shown in Fig. 9. This contact-piece $A^4$ (which in Fig. 9 is distinguished from the non-conducting portion $A^2$ by being left white, while the latter is made black) extends the whole length of the cylinder and is gradually reduced in width by a series of notches or steps.

R R indicate a series of resistances connected at one terminal to the line 30 and having their opposite terminals ending respectively in a series of contact-pieces $b'$ $c'$ $d'$, &c. These contact-pieces are arranged as shown in elevation, Fig. 6, and in section, Fig. 8, and each consists of an angular part $b^2$, held firmly by an upright block of insulating material D. The contact-pieces are pivoted to the angular pieces $b^2$, as shown in Fig. 8, and pressed against rheostat-cylinder A by means of a spring $b^3$. In order to prevent the brush $b'$ from dropping on the insulating or main portion of the cylinder after it leaves the contact $A^4$, a lug $b^5$ extends downward into a slot in the part $b^2$ and engages with a screw $b^6$. This screw $b^6$ renders the brush adjustable for wear and is held in the position desired by means of a set-screw $b^7$.

For making electrical connection with the larger contact-brushes of the series an eye $b^4$ is provided, into which the end of a flexible wire may be soldered. Within the body of the cylinder A and beneath the contact-piece $A^4$ is a plate of iron $A^5$, forming an armature to the blow-out magnet E. The pole-piece $A^5$ extends spirally from top to bottom of the cylinder, so as to follow the receding line of the contact-piece $A^4$. As the cylinder is turned will always serve to complete the magnetic circuit of E, so that the latter may act more strongly to interrupt any arc that may be formed by the passage of any of the contact-pieces $a'$ $c'$, &c., from the conducting portions $A^4$ to the insulating portion $A^2$ of the cylinder. As appears in Fig. 6, the rheostat-cylinder A is mounted vertically with an inclosing frame F and provided with a handle G for turning it. The insulating-standard D is mounted in the same frame parallel to the cylinder, so that the various contact-pieces which it carries may bear on the surface of the latter. The magnet E, as appears from the same Fig. 6, is mounted on a board K so that the core of the magnet is parallel to the cylinder and its poles adjacent to the series of contact-pieces. It will be seen that the three lower contact-pieces are of a larger size than the others, having a multiplicity of fingers, and that the blow-out magnet E is divided into two sections, the lower and shorter section $E'$ being opposite the larger contact-pieces. This arrangement is simply for the purpose of securing greater magnetic concentration at the points when a greater current is being carried by the contacts and broken by the passage of the contact-pieces from the conducting to the insulating portions of the switch-cylinder.

The rheostat-cylinder, as appears from Figs. 6 and 7, is provided with a pinion H, engaging with a gear-wheel I on the switch-cylinder, so that the latter rotates once while the larger rotates five times. This switch-cylinder is similar in character to the rheostat-cylinder, and like the latter is journaled in frame F and has a series of contact-pieces $a$ $b$ $c$, &c., bearing, respectively, on a series of contact-plates on the surface of the cylinder. These contact-pieces are connected, respectively, to the several line-terminals and motor-terminals, as shown in Fig. 9, and the contact-plates on the surface of the cylinder are arranged as shown in the same figure.

We believe that the general construction of our controller will be clear from the foregoing description.

We will now proceed to describe the operation of the same.

Referring especially to Fig. 9, and to the diagram Figs. 1 to 5, the contact-plates on the switch-cylinder are numbered from 1 to 28, and the successive positions which the contact-pieces $a$ $b$ $c$, &c., assume as they are moved around the cylinder are represented by the dotted lines from 1 to 12. Of these various positions the running positions, or those in which the controller may be left inadvertently without injury to the apparatus in order to give a desired speed, are indicated by the lines 2, 5, 7, 10 and 12. The other positions are those in which certain preparatory changes are being made accompanied by an insertion of the resistance before the controller is brought to rest at the several running positions. Assuming now that the parts are in a position of open circuit, the various contact-pieces will rest on the insulating part of the cylinders and no current will pass. The first movement, however, of handle G will bring the line of contact-pieces $a$ $b$ $c$, &c., into coincidence with the dotted line 1 of the switch-cylinder, while on the rheostat-cylinder the contact-pieces $a'$ and $b'$ will rest against plate $A^4$. The circuit will then be as follows: terminals T, contact $a$, plate 1, plate 5, contact $b$, line 31, contact $a'$, plate $A^4$, contact $b'$, resistance R, magnet E, line 30, magnet $E'$, contact $k$, plate 28, plate 12, contact $e$, motor W, contact $c$, plate 8, plate 17, contact $g$, motor X, contact $i$, plate 22, plate 14, contact $f$, motor Y, contact $d$, plate 10, plate 19, contact $h$, motor Z and to the opposite terminals S. As the handle G continues to turn, the rheostat-cylinder will rotate until the contact-pieces are forced into the position indicated by the dotted line $xx$ and the line of contact-pieces on the switch-cylinder will in the same time be moved to the position of the dotted line 2, the result being that the resistance is gradually and entirely short-circuited, the current passing directly from the contact-piece $a'$, by the plate $A^4$, to the plate $p'$. The motors will still be in series with no resistance in circuit, and will be running at their slowest speed, assuming a constant electromotive force on the line. As the rheostats R are in multiple the resistance will be greatest when one of them is in circuit, and it will be reduced as they are successively connected in multiple by the step contact-plate $A^4$ until finally they have all been short-circuited, as above described, and will remain so while the cylinder is turning from a position with the brushes on the line $x\,x$ to the position with the brushes on the insulating material $A^2$, when the resistance again comes to a maximum.

We have thus shown how the motors are first connected in series with the resistance and the resistance then cut out without changing the relation of the motors, such connections being diagrammatically shown in Fig. 1, positions 1 and 2. It will not be necessary, we believe, to trace in detail the succeeding connections as the contacts on the switch-cylinder pass into the successive positions; but it will be sufficient to refer to Figs. 2, 3, 4 and 5, wherein are shown diagrammatically the different groupings of the motors and resistance corresponding to the successive positions of the contact on the cylinder. Thus in Fig. 2 it will be seen that in position 3 four motors are in series, but two of them are shunted through resistance R. In position 4 the resistance is cut out by the rotation of the resistance-cylinder and the two motors are shunted without resistance, while in position 5 two motors are out of circuit entirely, leaving the remaining two in series to drive the locomotive. This is a running position, and a second rate of speed is thereby secured.

In Fig. 3 are shown the groupings corresponding to positions 6 and 7. In the former the four motors are in parallel series, one of the series containing the resistance, while in the latter position the resistance is cut out and the four motors will be running in simple parallel-series connection.

In Fig. 4 are shown the groupings corresponding to the positions 8, 9 and 10.

In Fig. 8 one motor out of each series is short-circuited through the resistance, and in position 9 the resistance is cut out, while in running position, 10, we have only two motors in parallel, the other two being out of circuit, and, lastly, Fig. 5 shows the groupings corresponding to positions 11 and 12. In the former position the motors are all in parallel, but the resistance is in series with two of them, while in the latter position the resistance is cut out and the four motors are in plain parallel connection.

We have thus described the construction of our controller and its mode of operation whereby four machines are gradually changed from series to parallel connection, and by means of a single resistance, which is successively introduced into the circuit at the instants of change, we are enabled to produce a succession of increasing speeds without injury to the motors and without shock to the passengers, assuming of course that the dynamo-electric machines are used for motive purposes and are by any desired means geared to the driving-wheels of a single locomotive.

By a "single locomotive" we mean simply a common load upon which the motors may act.

We are aware that it is not new to change motors from series to parallel and to introduce a resistance while the changes are being made; but we believe we are the first ones to adapt this principle to four motors and to devise the particular apparatus above described by which this is accomplished.

We would call especial attention to the feature of having the switch-contacts and the rheostat-contacts upon separate cylinders with a definite rate of gearing whereby the same rheostats may be used in succession, and we may also add that the importance of our invention is emphasized when it becomes necessary, as in the recent application of electric motors to large locomotive work, to employ heavy machines demanding a large current at a comparatively high voltage where the difficulties connected with the change in the circuit connections of such large machines and the passing of such heavy currents through resistances are very great.

We believe that the controller we have described above is one adapted for the successful solution of this problem.

What we claim as our invention, and desire to secure by Letters Patent, is as follows:

1. In a series-parallel controller, the combination with a switch for changing the groupings of two or more dynamo-electric machines of a rheostat provided with a set of contacts and a contact-plate therefor movable at a definite different speed relatively to the said switch, whereby the resistances are successively introduced into and withdrawn from the circuit at periods corresponding to the successive changes in groupings of the machines effected by the switch.

2. In a series-parallel controller, the combination with a switch for changing the groupings of two or more dynamo-electric machines and a rheostat having a series of contacts and a contact-plate separate from the switch movable at a definite different speed relatively to the said switch adapted to connect the sections of the rheostat in parallel to lower the resistance, the said contact-plate separate from the switch and said switch being connected so as to operate together and successively introduce into and withdraw from the circuit the resistance of the rheostat at periods corresponding to the changes in the grouping of the machines effected by the switch.

3. In a series-parallel controller, the combination with a switch, substantially as described for changing the groupings of two or more dynamo-electric machines, of a rheostat adapted to connect it in series with the machines and a contact therefor, the switch and rheostat being connected so as to be operated at definite relative speeds thereby introducing the rheostat into the circuit during temporary changes in the successive groupings of the machines and to withdraw it from the circuit when the machines are grouped for each permanent and definite rate of speed.

4. In a series-parallel controller, the combination with a switch for changing the groupings of two or more dynamo-electric machines, of separately-controlled current-reducing means, and a mechanical connection between said switch and current-reducing means whereby the latter is successively operated a number of times during the operation of the former to include the resistance in series with all or part of the machines, as set forth.

5. In a series-parallel controller, the combination with a switch, of a resistance, circuit connections between said switch and resistance, and means separate from the switch, but operated thereby, for repeatedly introducing and cutting out said resistance during a single operation of said switch to include the resistance in series with all or part of the machines, as set forth.

6. In a series-parallel controller, the combination with a contact-cylinder of a connecting-plate thereon against which contact-pieces are adapted to bear, a plate of magnetic material beneath said contact-plate and a magnet having its poles in proximity to said plate whereby the effect of said magnet may be intensified and interrupt any arc which may be formed on breaking of the connections between the contact-pieces and their connecting-plate.

7. The method of changing a plurality of machines from series to parallel, which consists of introducing into the circuit at the moment of change, a resistance, rapidly reducing said resistance and withdrawing the same after the change has been effected.

8. The method of changing motors from parallel series to parallel, which consists in shunting one half the motors from each series through a resistance, removing the resistance, breaking the circuit of the shunted motors and finally placing them in parallel with the other halves of the two series.

9. The method of changing motors from parallel series to parallel, which consists in shunting one half the motors from each series, breaking the short circuit and placing the two motors in parallel with the other two.

10. The method of changing motors from parallel series to parallel, which consists in shunting part of the motors from each series, breaking the shunt, and placing the shunted part of the motors in parallel with the other part.

In witness whereof we have hereunto set our hands this 8th day of April, 1893.

WALTER H. KNIGHT.
JOHN W. DARLEY, JR.

Witnesses for Knight:
JOHN W. GIBBONEY,
BENJAMIN B. HULL.

Witnesses for Darley:
M. HOLZMAN,
A. WAGNER.